(12) United States Patent
Kuribara et al.

(10) Patent No.: US 10,017,059 B2
(45) Date of Patent: Jul. 10, 2018

(54) VEHICLE

(71) Applicant: Toyota Jidosha Kabushiki Kaisha, Toyota-shi Aichi-ken (JP)

(72) Inventors: Fumiyoshi Kuribara, Toyota (JP); Shigetaka Asano, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 20 days.

(21) Appl. No.: 15/462,296

(22) Filed: Mar. 17, 2017

(65) Prior Publication Data

US 2017/0274783 A1   Sep. 28, 2017

(30) Foreign Application Priority Data

Mar. 22, 2016   (JP) .................. 2016-057205

(51) Int. Cl.
| | |
|---|---|
| B60L 11/18 | (2006.01) |
| H02J 7/02 | (2016.01) |
| H02J 7/00 | (2006.01) |
| H02P 27/06 | (2006.01) |

(52) U.S. Cl.
CPC ....... B60L 11/1811 (2013.01); B60L 11/1875 (2013.01); H02J 7/0052 (2013.01); H02J 7/022 (2013.01); H02P 27/06 (2013.01); *B60L 2210/10* (2013.01); *H02J 2007/0059* (2013.01)

(58) Field of Classification Search
CPC .. H02J 7/0052; H02J 2007/0059; H02J 7/022; B60L 11/1811; B60L 11/1875; B60L 2210/10; H02P 27/06
USPC ........................................................ 320/109
See application file for complete search history.

(56) References Cited

U.S. PATENT DOCUMENTS

| | | | | |
|---|---|---|---|---|
| 2010/0078993 A1* | 4/2010 | Ichikawa | ................ | B60L 3/003 307/10.1 |
| 2015/0210181 A1* | 7/2015 | Niioka | .................. | H01M 10/48 701/22 |

FOREIGN PATENT DOCUMENTS

| | | | |
|---|---|---|---|
| JP | 2009027812 A | | 2/2009 |
| JP | 2011-259612 A | | 12/2011 |
| JP | 2015061356 A | | 3/2015 |
| JP | 2015180138 A | | 10/2015 |
| WO | 2013/098904 A1 | | 7/2013 |
| WO | WO2013098904 | * | 7/2013 |
| WO | 2014045776 A1 | | 3/2014 |
| WO | 2015140618 A1 | | 9/2015 |

\* cited by examiner

*Primary Examiner* — Nathaniel Pelton
(74) *Attorney, Agent, or Firm* — Dinsmore & Shohl LLP

(57) ABSTRACT

A vehicle includes a motor, a high voltage battery, a charger; an accessory; a first DC/DC converter, a second DC/DC converter, and an electronic control unit configured to: end the external charging, when a power storage ratio of the high voltage battery reaches a target ratio or when charged electric power of the high voltage battery becomes equal to or less than predetermined electric power before the power storage ratio of the high voltage battery reaches the target ratio, while external charging for charging the high voltage battery with the charger using electric power from the external power supply is being performed; and limit a drive of the accessory compared to when the electric power from the external power supply is greater than the predetermined electric power, when the electric power from the external power supply is equal to or less than predetermined electric power.

2 Claims, 3 Drawing Sheets

VEHICLE

CROSS-REFERENCE TO RELATED APPLICATIONS

This application claims priority to Japanese Patent Application No. 2016-057205 filed on Mar. 22, 2016 which is incorporated herein by reference in its entirety including the specification, drawings and abstract.

BACKGROUND

1. Technical Field

The present disclosure relates to a vehicle, and in particular, to a vehicle with a motor, a high voltage battery, a charger, and two DC/DC converters.

2. Description of Related Art

Hitherto, as such a kind of vehicle, a vehicle provided with a motor for traveling, an assembled battery connected to the motor through a first power line, a charger connected to the first power line and configured to charge the assembled battery using electric power from an external power supply, an accessory connected to a second power line, a first DC/DC converter configured to supply electric power of the first power line to the second power line with deboosting a voltage, and a second DC/DC converter incorporated in the charger and configured to supply electric power of the first power line to the second power line with deboosting a voltage has been suggested (for example, see International Publication No. 2013-098904 (WO 2013-098904 A)).

SUMMARY

In such a vehicle, in a case of a specification in which, if the charged electric power of the assembled battery becomes equal to or less than predetermined electric power (for example, becomes near zero or minus), the external charging ends, when electric power from the external power supply is comparatively small and electric power supplied to the second power line by the first DC/DC converter or the second DC/DC converter is comparatively large (the power consumption of the accessory is comparatively large), the charged electric power of the assembled battery becomes equal to or less than the predetermined electric power, and there is a possibility that the external charging ends halfway (before a power storage ratio of the assembled battery reaches a target ratio).

A primary object of a vehicle of the disclosure is to suppress the end of charging of a high voltage battery halfway with a charger using electric power from an external power supply when electric power from the external power supply is comparatively small.

The vehicle of the disclosure has employed the following means in order to attain the above-described primary object.

A vehicle of the present disclosure includes a motor for traveling, a high voltage battery connected to the motor through a high voltage system power line, a charger connected to the high voltage system power line and configured to charge the high voltage battery using electric power from an external power supply, an accessory connected to a low voltage system power line, a first DC/DC converter connected to the high voltage system power line and the low voltage system power line and configured to supply electric power of the high voltage system power line to the low voltage system power line with deboosting a voltage, a second DC/DC converter connected to the high voltage system power line on the charger side from the first DC/DC converter and the low voltage system power line and configured to supply electric power of the high voltage system power line to the low voltage system power line with deboosting a voltage, and an electronic control unit configured to end the external charging, when a power storage ratio of the high voltage battery reaches a target ratio or when charged electric power of the high voltage battery becomes equal to or less than predetermined electric power before the power storage ratio of the high voltage battery reaches the target ratio, while external charging for charging the high voltage battery with the charger using electric power from the external power supply is being performed. The electronic control unit is configured to limit the drive of an accessory compared to when the electric power from the external power supply is greater than the predetermined electric power, when the electric power from the external power supply is equal to or less than predetermined electric power.

In the electric vehicle of the disclosure, while the external charging for charging the high voltage battery with the charger using the electric power from the external power supply is being performed, when the power storage ratio of the high voltage battery reaches the target ratio and the charged electric power of the high voltage battery is equal to or less than the predetermined electric power before the power storage ratio of the high voltage battery reaches the target ratio, the external charging ends. In this way, in ending the external charging, when the electric power from the external power supply is equal to or less than the predetermined electric power, the drive of the accessory is limited compared to when the electric power from the external power supply is greater than the predetermined electric power. With this, when the electric power from the external power supply is equal to or less than the predetermined electric power, since it is possible to reduce electric power supplied to the second power line by the first DC/DC converter or the second DC/DC converter, it is possible to prevent the charged electric power of the high voltage battery from becoming equal to or less than the predetermined electric power. As a result, when the electric power from the external power supply is comparatively small, it is possible to suppress the end of the external charging halfway (before the power storage ratio of the high voltage battery reaches the target ratio).

In the electric vehicle of the disclosure, the accessory may be a temperature raising heater of the high voltage battery. In a case of this configuration, when the electric power from the external power supply is equal to or less than the predetermined electric power, the drive of the heater as the accessory is inhibited, while it is not possible to increase the temperature of the high voltage battery with the heater, it is possible to suppress the end of the external charging halfway.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Next, a mode for carrying out the disclosure will be described in connection with an example.

Figure 1:
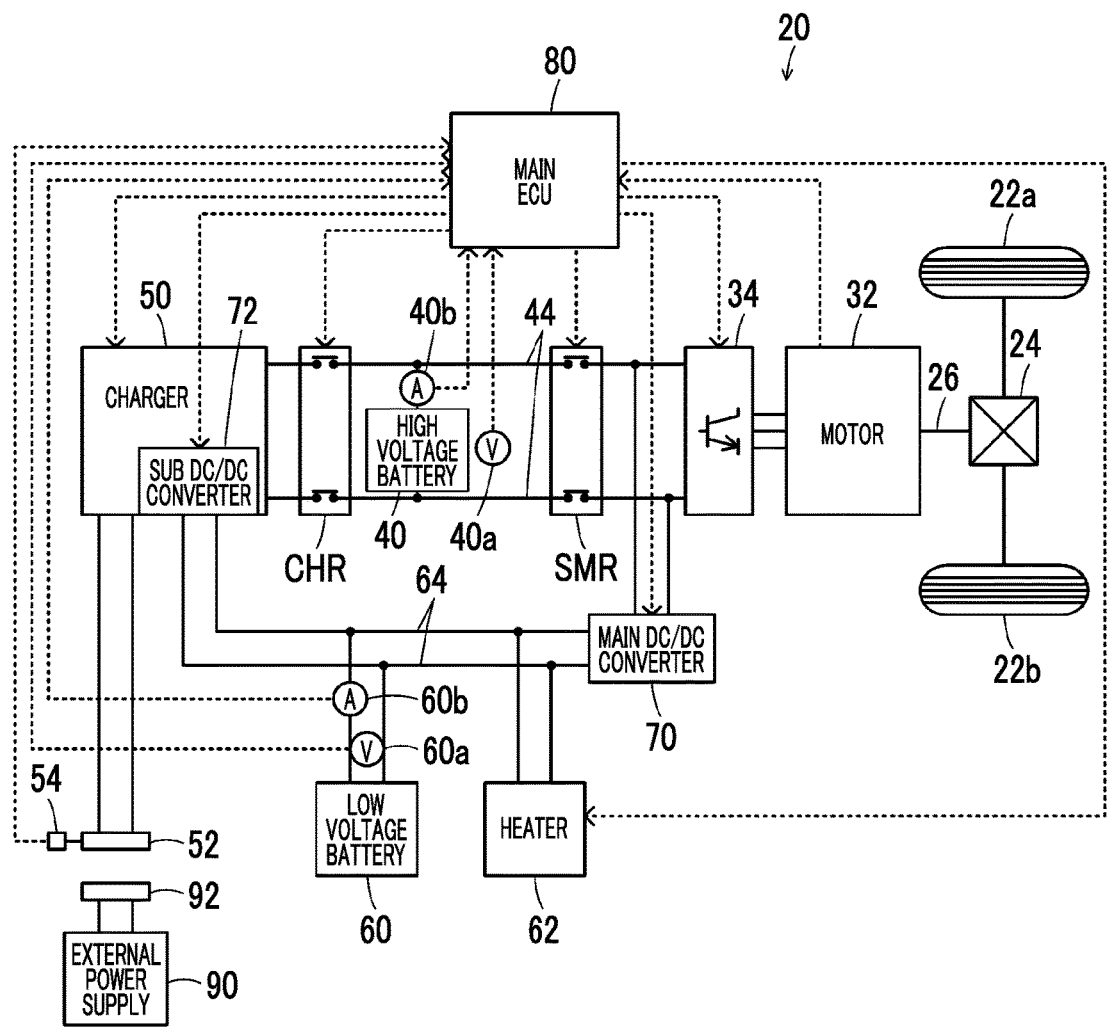
FIG. 1 is a configuration diagram showing the outline of the configuration of an electric vehicle as an example of the disclosure.

FIG. 1 is a configuration diagram showing the outline of the configuration of an electric vehicle 20 as an example of the disclosure. As shown in the drawing, the electric vehicle 20 of the example is provided with a motor 32, an inverter 34, a high voltage battery 40, a charger 50, a low voltage battery 60, a main DC/DC converter 70, a sub DC/DC converter 72, a system main relay SMR, a charging relay CHR, and a main electronic control unit (hereinafter, referred to as a "main ECU") 80.

The motor 32 is constituted as, for example, a synchronous motor generator, and is connected to a drive shaft 26 coupled to drive wheels 22a, 22b through a differential gear 24. The inverter 34 is used for driving the motor 32, and is connected to a high voltage system power line 44. The motor 32 is rotationally driven through switching control of a plurality of switching elements (not shown) of the inverter 34 by the main ECU 80. The high voltage battery 40 is constituted as, for example, a lithium-ion secondary battery or a nickel-hydrogen secondary battery having a rated voltage of 200 V, 250 V, 300 V, or the like, and is connected to the inverter 34 through the high voltage system power line 44 as described above.

The charger 50 is connected to the high voltage system power line 44 and is configured to charge the high voltage battery 40 using electric power from an external power supply 90 when a vehicle-side connector 52 is connected to a power supply-side connector 92 of the external power supply 90. The charger 50 supplies electric power from the external power supply 90 to the high voltage battery 40 side under the control of the main ECU 80 when the vehicle-side connector 52 is connected to the power supply-side connector 92.

The low voltage battery 60 is constituted as, for example, a lead storage battery having a rated voltage of 12 V or the like, and is connected to a low voltage system power line 64. A plurality of accessories, such as a temperature raising heater 62 of the high voltage battery 40, a headlight, a room lamp, an audio system, a power window, and a seat heater, and an electronic control unit, such as the main ECU 80, are also connected to the low voltage system power line 64.

The main DC/DC converter 70 is connected to the high voltage system power line 44 and the low voltage system power line 64. The main DC/DC converter 70 supplies the electric power of the high voltage system power line 44 to the low voltage system power line 64 with deboosting a voltage under the control of the main ECU 80.

The sub DC/DC converter 72 is constituted as a DC/DC converter having a rated output smaller than that of the main DC/DC converter 70. The sub DC/DC converter 72 is connected to the high voltage system power line 44 on the charger 50 side from the main DC/DC converter 70 and the low voltage system power line 64. In the example, it is assumed that the sub DC/DC converter 72 is incorporated in the charger 50. The sub DC/DC converter 72 supplies the electric power of the high voltage system power line 44 to the low voltage system power line 64 with deboosting a voltage under the control of the main ECU 80.

The system main relay SMR is provided between the high voltage battery 40 and the inverter 34 or the main DC/DC converter 70 in the high voltage system power line 44, and is turned on and off to connect or release the connection of the high voltage battery 40 side and the inverter 34 or the main DC/DC converter 70 side under the control of the main ECU 80.

The charging relay CHR is provided between the high voltage battery 40 and the charger 50 or the sub DC/DC converter 72 in the high voltage system power line 44, and is turned on and off to connect or release the connection of the high voltage battery 40 side and the charger 50 or the sub DC/DC converter 72 side under the control of the main ECU 80.

Though not shown, the main ECU 80 is constituted as a microprocessor centering on a CPU, and is provided with, in addition to the CPU, a ROM which stores a processing program, a RAM which temporarily stores data, an input/output port, and the like. To the main ECU 80, signals from various sensors are input through the input port.

As the signals which are input to the main ECU 80, for example, a rotation position of a rotor of the motor 32 from a rotation position sensor configured to detect the rotation position of the rotor of the motor 32, a voltage Vb1 from a voltage sensor 40a attached between terminals of the high voltage battery 40, a current Ib1 from a current sensor 40b attached to an output terminal of the high voltage battery 40, and the like can be exemplified. Signals from various sensors attached to the charger 50, a connection signal from a connection switch 54 attached to the vehicle-side connector 52 and configured to determine whether or not the vehicle-side connector 52 and the power supply-side connector 92 of the external power supply 90 are connected, and the like can also be exemplified. Furthermore, a voltage Vb2 from a voltage sensor 60a attached between terminals of the low voltage battery 60, a current Ib2 from a current sensor 60b attached to an output terminal of the low voltage battery 60, and the like can also be exemplified. In addition, an ignition signal from an ignition switch, a shift position SP from a shift position sensor, an accelerator pedal angle from an accelerator pedal position sensor, a brake pedal position from a brake pedal position sensor, a vehicle speed from a vehicle speed sensor, and the like can also be exemplified.

From the main ECU 80, various control signals are output through the output port. As the signals which are output from the main ECU 80, for example, a switching control signal to a plurality of switching elements of the inverter 34, a control signal to the charger 50, control signals to the accessories, such as the temperature raising heater 62 of the high voltage battery 40, a control signal to the main DC/DC converter 70, a control signal to the sub DC/DC converter 72, a control signal to the system main relay SMR, a control signal to the charging relay CHR, and the like can be exemplified.

The main ECU 80 calculates a power storage ratio SOC1 of the high voltage battery 40 based on an integrated value of the current Ib1 of the high voltage battery 40 from the current sensor 40b, or calculates a power storage ratio SOC2 of the low voltage battery 60 based on an integrated value of the current Ib2 of the low voltage battery 60 from the current sensor 60b.

In the electric vehicle 20 of the example configured as above, when the vehicle is parked at home or a charging point, such as a charging station, if the vehicle-side connector 52 and the power supply-side connector 92 of the external power supply 90 are connected, the main ECU 80 turns on the charging relay CHR to perform control such that the charger 50 charges the high voltage battery 40 using electric power from the external power supply 90. Hereinafter, charging of the high voltage battery 40 by the charger 50 using electric power from the external power supply 90 is referred to as "external charging".

At the time of the external charging, main ECU 80 drives the sub DC/DC converter 72 to perform sub-power feeding processing for feeding electric power to the low voltage system power line 64 or drives the main DC/DC converter 70 to performs main power feeding processing to feed electric power to the low voltage system power line 64. In the example, in consideration of the rated output of the sub DC/DC converter 72 smaller than the rated output of the main DC/DC converter 70, when it is not necessary to supply very large electric power to the low voltage system power line 64, the sub-power feeding processing is performed, and when it is necessary to supply comparatively large electric power to the low voltage system power line 64, the main power feeding processing is performed. It is necessary to supply comparatively large electric power to the low voltage system power line 64 when it is necessary to charge the low voltage battery 60 (when the voltage Vb2 or the power storage ratio SOC2 of the low voltage battery 60 decreases to be less than a threshold). In order to perform the main power feeding processing, the system main relay SMR needs to be turned on.

While the external charging is being performed, when the power storage ratio SOC1 of the high voltage battery 40 reaches the target ratio SOC* and when charged electric power Pch of the high voltage battery 40 is equal to or less than a threshold Pchref before the power storage ratio SOC1 of the high voltage battery 40 reaches the target ratio SOC*, the external charging ends. In regard to the power storage ratio SOC1 of the high voltage battery 40, a value calculated based on the integrated value of the current Ib1 of the high voltage battery 40 from the current sensor 40b can be used. In regard to the target ratio SOC*, for example, 80%, 85%, 90%, or the like can be used. In regard to the charged electric power Pch of the high voltage battery 40, a product (a positive value when charging the high voltage battery 40) of the voltage Vb1 of the high voltage battery 40 from the voltage sensor 40a and the current Ib1 of the high voltage battery 40 from the current sensor 40b can be used. In regard to the threshold Pchref, for example, 200 W, 250 W, 300 W, or the like can be used.

Figure 2:
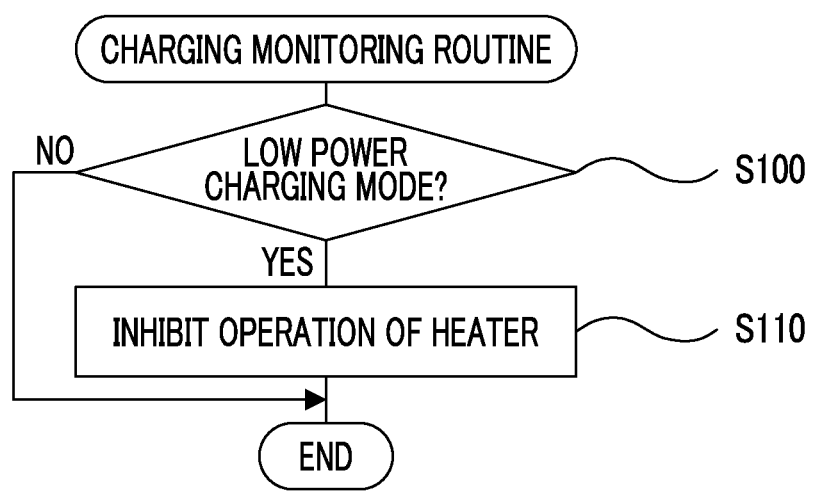
FIG. 2 is a flowchart showing an example of a charging monitoring routine which is executed by a main ECU of the example.

Next, the operation of the electric vehicle 20 of the example configured as above, in particular, the operation when monitoring the external charging will be described. FIG. 2 is a flowchart showing an example of a charging monitoring routine which is executed by the main ECU 80 of the example. This routine is executed when the external charging is started.

If the charging monitoring routine is executed, the main ECU 80 first determines whether or not a low power charging mode is executed (Step S100). In the example, supply electric power Pps from the external power supply 90 is compared with a threshold Ppsref, and when the supply electric power Pps from the external power supply 90 is greater than the threshold Ppsref, it is determined that the low power charging mode is not executed, and when the supply electric power Pps from the external power supply 90 is equal to or less than the threshold Ppsref, it is determined that the low power charging mode is executed. The supply electric power Pps from the external power supply 90 can be input from an external charging device provided with the external power supply 90 through communication and used or the input electric power of the charger 50 can be input as the supply electric power Pps and used. In regard to the threshold Ppsref, for example, 800 W, 900 W, 1000 W, or the like can be used.

When the low power charging mode is not executed, this routine ends as it is, and when the low power charging mode is executed, the drive of the temperature raising heater 62 of the high voltage battery 40 is inhibited (Step S110) and this routine ends. With this, when the low power charging mode is executed, while it is not possible to increase the temperature of the high voltage battery 40 with the heater 62, it is possible to reduce electric power supplied to the low voltage system power line 64 by the main DC/DC converter 70 or the sub DC/DC converter 72, and to prevent the charged electric power Pch of the high voltage battery 40 from becoming equal to or less than the predetermined electric power Pchref. As a result, when the low power charging mode is executed, it is possible to suppress the end of the external charging halfway (before the power storage ratio SOC1 of the high voltage battery 40 reaches the target ratio SOC*).

In the electric vehicle 20 of the example described above, while the external charging is being performed, when the power storage ratio SOC1 of the high voltage battery 40 reaches the target ratio SOC* and when the charged electric power Pch of the high voltage battery 40 is equal to or less than the threshold Pchref before the power storage ratio SOC1 of the high voltage battery 40 reaches the target ratio SOC*, the external charging ends. In this way, in ending the external charging, when the low power charging mode is executed, the drive of the temperature raising heater 62 of the high voltage battery 40 is inhibited. With this, it is possible to prevent the charged electric power Pch of the high voltage battery 40 from becoming equal to or less than the predetermined electric power Pchref, and to suppress the end of the external charging halfway (before the power storage ratio SOC1 of the high voltage battery 40 reaches the target ratio SOC*).

In the electric vehicle 20 of the example, although, when the low power charging mode is executed, the drive of the temperature raising heater 62 of the high voltage battery 40 is inhibited, the drive of an accessory other than the heater 62, for example, a cooling fan or the like of the high voltage battery 40 may be inhibited.

Figure 3:
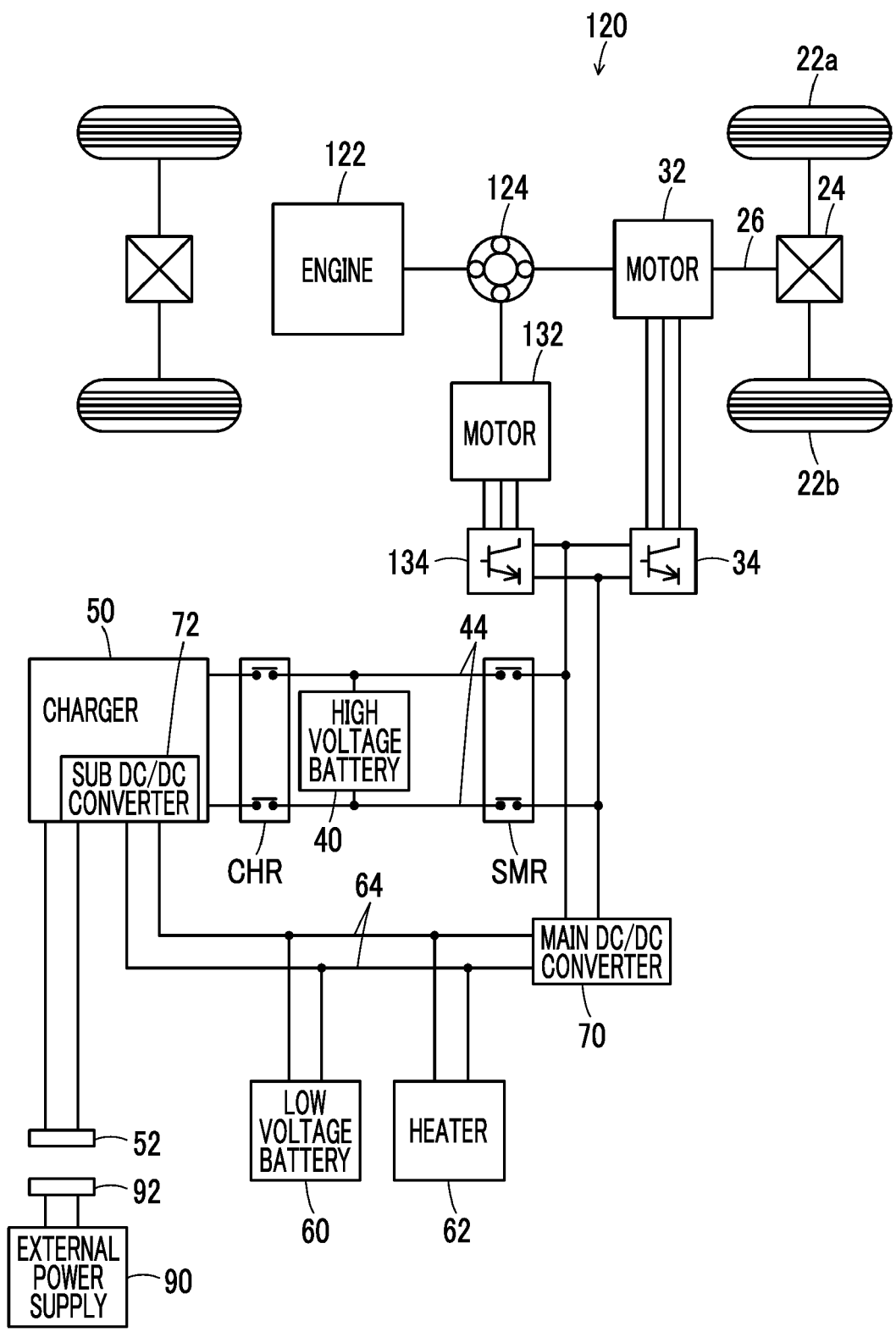
FIG. 3 is a configuration diagram showing the outline of the configuration of a hybrid vehicle of a modification example.

In the electric vehicle 20 of the example, a configuration has been made in which the motor 32, the inverter 34, the high voltage battery 40, the charger 50, the accessories, such as the heater 62, the main DC/DC converter 70, and the sub DC/DC converter 72 are provided. However, as shown in a hybrid vehicle 120 of a modification example of FIG. 3, a configuration may be made in which, in addition to the motor 32, the inverter 34, the high voltage battery 40, the charger 50, the accessories, such as the heater 62, the main DC/DC converter 70, and the sub DC/DC converter 72, an engine 122, a planetary gear 124, a motor 132, and an inverter 134 are provided. The motor 132 is connected to a sun gear of the planetary gear 124, the engine 122 is connected to a carrier of the planetary gear 124, and a drive shaft 26 and the motor 32 are connected to a ring gear of the planetary gear 124. The inverter 34 is used for driving the motor 132, and is connected to the high voltage system power line 44 along with the inverter 34.

The correspondence relationship between the primary components of the example and the primary components of the disclosure described in Summary will be described. In the example, the motor 32 corresponds to a "motor", the high voltage battery 40 corresponds to a "high voltage battery", the charger 50 corresponds to a "charger", the temperature raising heater 62 of the high voltage battery 40 corresponds to an "accessory", the main DC/DC converter 70 corresponds to a "first DC/DC converter", the sub DC/DC converter 72 corresponds to a "second DC/DC converter", and the main ECU 80 corresponds to "control means".

The correspondence relationship between the primary components of the example and the primary components of the disclosure described in Summary should not be considered to limit the components of the disclosure described in Summary since the example is only illustrative to specifically describe the aspects of the disclosure. That is, the disclosure described in Summary should be interpreted based on the description in Summary, and the example is only a specific example of the disclosure described in Summary.

Although the mode for carrying out the disclosure has been described above in connection with the example, the disclosure is not limited to the example, and can be of course carried out in various forms without departing from the spirit and scope of the disclosure.

The disclosure is usable in a manufacturing industry of a vehicle.

What is claimed is:

1. A vehicle comprising:
    a motor for traveling;
    a high voltage battery connected to the motor through a high voltage system power line;
    a charger connected to the high voltage system power line and configured to charge the high voltage battery using electric power from an external power supply;
    an accessory connected to a low voltage system power line;
    a first DC/DC converter connected to the high voltage system power line and the low voltage system power line and configured to supply electric power of the high voltage system power line to the low voltage system power line with deboosting a voltage;
    a second DC/DC converter connected to the high voltage system power line on a charger side from the first DC/DC converter and the low voltage system power line and configured to supply electric power of the high voltage system power line to the low voltage system power line with deboosting a voltage; and
    an electronic control unit configured to end the external charging, when a power storage ratio of the high voltage battery reaches a target ratio or when charged electric power of the high voltage battery becomes equal to or less than predetermined electric power before the power storage ratio of the high voltage battery reaches the target ratio, while external charging for charging the high voltage battery with the charger using electric power from the external power supply is being performed, wherein the electronic control unit is configured to limit a drive of the accessory compared to when the electric power from the external power supply is greater than the predetermined electric power, when the electric power from the external power supply is equal to or less than predetermined electric power.

2. The vehicle according to claim 1,
    wherein the accessory is a temperature raising heater of the high voltage battery.

* * * * *